Jan. 13, 1970 H. W. JONES ET AL 3,489,381

MAGNETIC HEAD MOUNT APPARATUS

Filed Feb. 1, 1968 2 Sheets-Sheet 1

INVENTORS.
HENRY WILLIAM JONES
WILLIAM EDWARD MENELEY
BY Karl H. Sommermeyer
ATTORNEY

MAGNETIC HEAD MOUNT APPARATUS

Filed Feb. 1, 1968 2 Sheets-Sheet 2

United States Patent Office 3,489,381

Patented Jan. 13, 1970

3,489,381

MAGNETIC HEAD MOUNT APPARATUS

Henry William Jones, Castro Valley, and William Edward Meneley, Oakland, Calif., assignors to The Singer Company, a corporation of New Jersey Filed Feb. 1, 1968, Ser. No. 702,472
Int. Cl. A47f *5/00;* A47h *1/10*
U.S. Cl. 248—204 5 Claims

ABSTRACT OF THE DISCLOSURE

The sheet metal gimbal for the slider of a flying head is preformed in a bow shape and also loaded as a strut so that the deflection involves both beam and toggle actions for permitting increased deflection within a prescribed force range

BACKGROUND OF THE INVENTION

Field of the invention

The present invention relates to supports for flying transducer heads for magnetic surface storage devices for computers, such as magnetic disc memories.

Description of the prior art

The present invention is an improvement on sheet metal gimbal mountings such as those shown in U.S. Patent No. 3,310,792.

SUMMARY OF THE INVENTION

The invention provides a simple compact spring gimbal for controlling the total load on the gas bearing between the slider and the disc, and for holding that force within a prescribed range while accommodating disc "run-out" and other tolerances that are very large compared to the permissible tolerance in the spacing between the slider and the magnetic record disc.

These and other objects and advantages of the present invention will be apparent from the following description of one specific embodiment thereof, taken in connection with the accompanying drawings, wherein.

Figure 1:
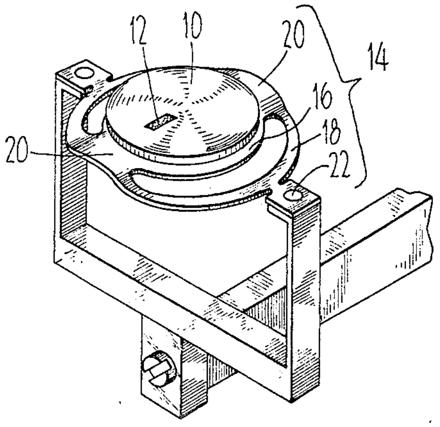
FIG. 1 is an isometric view of a flying head embodying our present invention.

In the drawings, some of the dimensions and motions are exaggerated for facilitating the explanation. Accordingly, some specific dimensions will be given.

Figure 2:
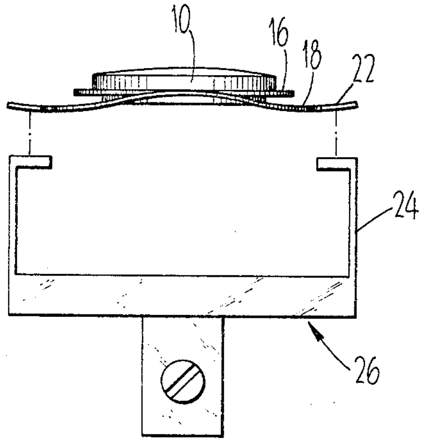
FIG. 2 is an elevational view showing the apparatus of FIG. 1 partially disassembled.
Figure 3:
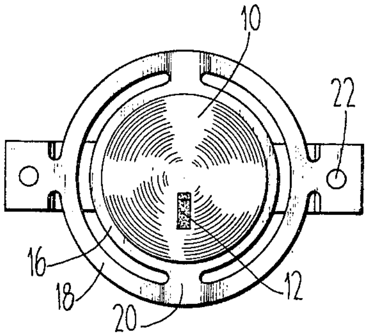
FIG. 3 is a plan view of the gimbal spring.
Figure 4:
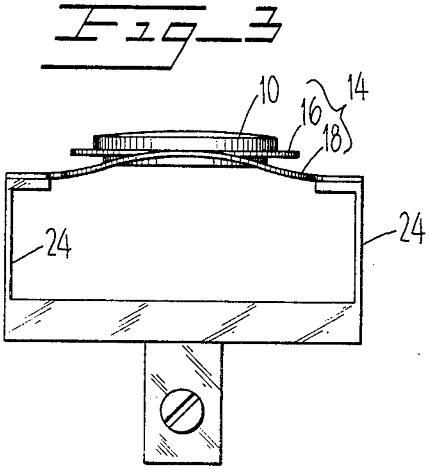
FIG. 4 is an elevational view similar to FIG. 2, showing the parts assembled.

Referring particularly to FIGS. 1, 2, 3 and 4, a flying head includes a ceramic, button-like slider 10, about one-half inch in diameter, having an upper convex surface with a crown of about seventy microinches. Embedded in the slider 10, and finished flush, is an electromagnetic transducer 12 for writing and recording a magnetic record. The slider 10 is supported in a sheet metal gimbal 14 which includes an inner ring 16 secured to the slider 10, an outer ring 18, diametrically opposite necks 20 connecting the two rings, and mounting tabs 22 extending from the outer ring at positions ninety degrees from the necks 20. As best seen in FIGS. 2 and 4, the outer ring 18 is preformed in a bow shape. The tabs 22 are fastened to the upper ends of resilient arms 24 of a yoke 26.

Figure 6:
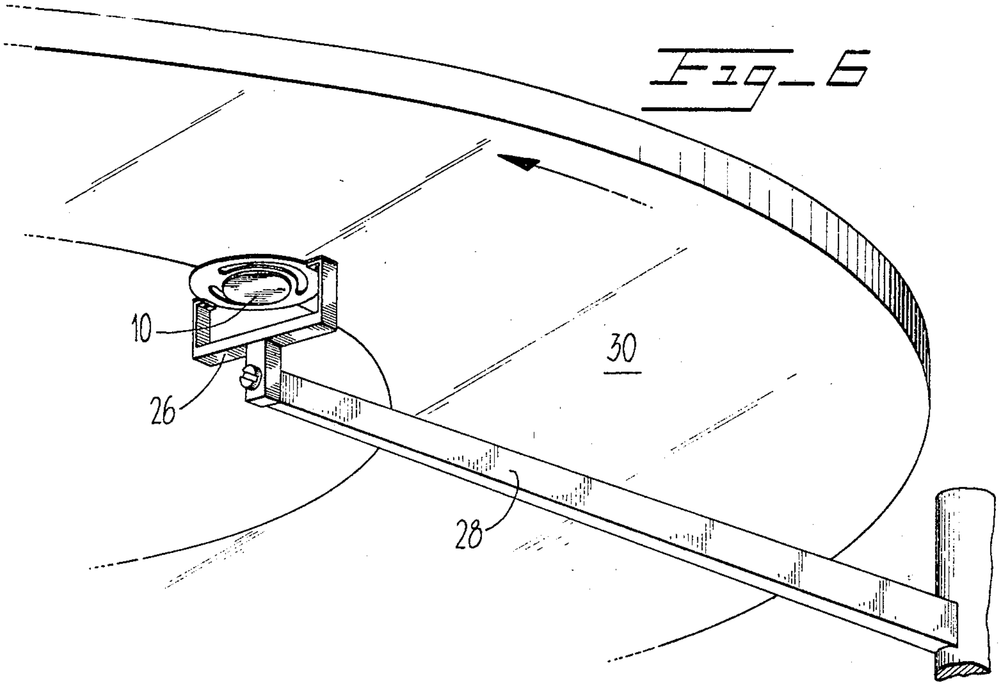
FIG. 6 is a perspective view showing the apparatus of FIG. 1 in operating position with respect to a magnetic record disc.

As seen in FIG. 6, the yoke 26 is carried on a swinging arm 28 for supporting the slider 10 under, and in close proximity to, the under surface of a rotating magnetic record disc 30. Means for controlling the position of the arm 28 and for retracting the slider 10 from the disc 30 are known and will not be described. In operation, the movement of disc 30 drags a film of air between it and the slider 10 and supports the slider 10 and holds it out of contact with the disc 30. This gas bearing between the slider 10 and disc 30 exhibits a resilience with a modulus of about three grams per microinch. Accordingly, the spacing between the slider and disc can be controlled by the upward force that is applied to the slider. Typically, the spacing during operation is fifty to one hundred microinches.

It is necessary to accommodate a "run-out" of typically .005 inch of the disc surface and also to accommodate similar tolerances in other parts of the mechanism. Yet it is desirable that variations, within these tolerances, of the spacing between disc 30 and yoke 26, should not alter the spacing between slider 10 and the disc by more than about ten microinches. Accordingly, it is desirable that the upward spring force applied to the slider 10 be maintained within a narrow range for a considerable movement of the slider 10 with respect to its supporting yoke 26. The present invention provides this operation by utilizing a combination of beam action and toggle action in the outer ring 18 of the gimbal 14.

Figure 5:
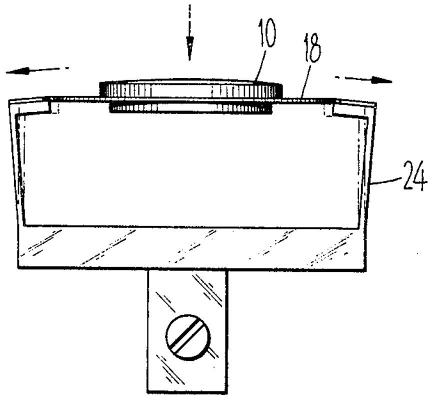
FIG. 5 is an elevational view similar to FIG. 4, for illustrating the action of the apparatus of our invention.

The beam action consists simply in the bending of the ring 18. For example, as the slider 10 is moved from the position of FIG. 4 to that of FIG. 5, the ring 18 is bent from its preformed, bowed position to a straight position, and the upward force due to the beam action increases continually during this downward movement.

The toggle action results from the strut, or thrusting action of ring 18 and the resilience of the legs 24. As the slider 10 moves from the position of FIG. 4 to FIG. 5, it moves the ring 18 from its bowed position to a straight or flat position, and in so doing, the ring 18 acts as a strut for spreading the resilient legs 24. The force required by this toggle action gradually increases and then, as the ring 18 approaches the flat, straight, or center position, the force required for the toggle goes to zero. If the slider 10 is pushed farther down, the toggle action goes over center and aids such further downward movement. That is, the upward force exerted by the toggle action reverses, and becomes a downward force.

Figure 7:
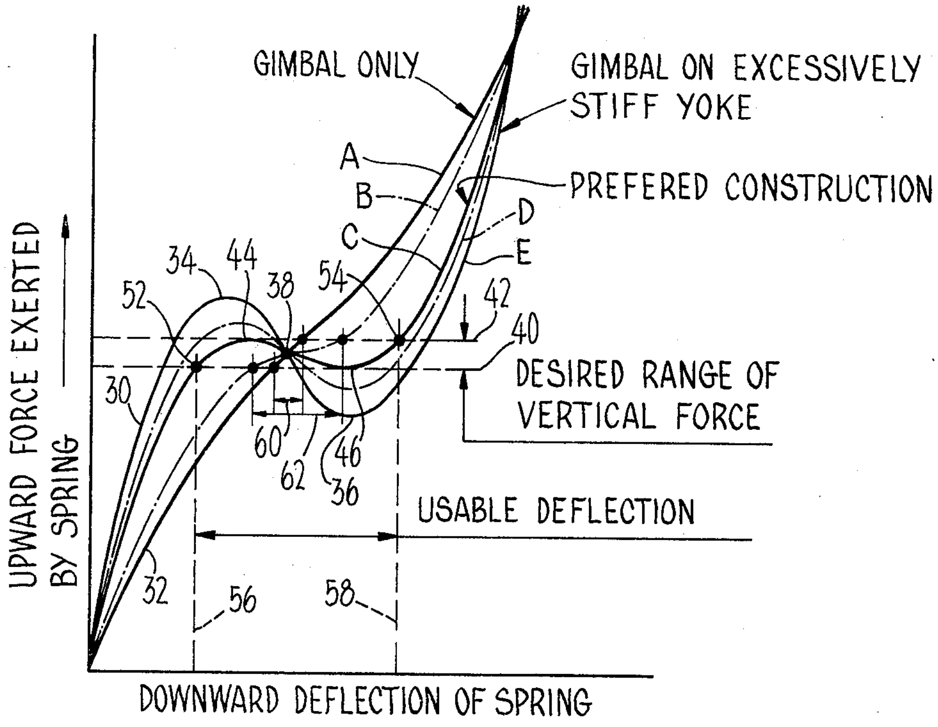
FIG. 7 is a deflection-force diagram for illustrating the action of the devices of our invention.

FIG. 7 is a diagram for showing how the beam forces and toggle forces are combined in the present structure. In this diagram, the position of the slider 10 is indicated by distances along the horizontal axis. The left end corresponds to the rest position, shown in FIG. 4, and distances to the right linearly indicate downward movement. The upward force exerted by the spring against the slider, or the force exerted down against the slider by the gas bearing to cause a deflection, these two forces being equal, and opposite, are indicated along the vertical axis. The lower end of the axis is the point of zero force, corresponding to the position of FIG. 4. Downward deflection of the slider 10, relative to the yoke 26, is indicated by distances above this zero point.

In FIG. 7, curve A depicts the force attributable to the beam action alone. Curve E depicts the total of the beam and toggle forces with a very stiff toggle effect, that is, with considerable stiffness in the resilient arms 24. It is to be noted that initially this total effect, for example, at the position 30 of curve E exerts a greater force than the beam action alone, as, for example, at the position 32 of curve A. As deflection continues and the force due to the toggle action begins to decrease, the total force reaches a maximum as at point 34 of curve E. Further deflection causes the total force to decrease until a minimum is reached at point 36. Although, in going from point 34 to point 36, the force due to the toggle action has reversed, the total force due to both the beam and the toggle has not reversed, but has merely decreased. Although a negative slope such as exhibited by this portion of the curve between points 34 and 36, will, in a suitable situation, induce an uncontrolled motion, or snap action, that action does not occur here because the motion is controlled by the air pressure between the slider 10 and disc 30, the action of which is thousands of times stiffer than the action of the gimbal 14. Then, as downward deflection of the slider 10, relative to the yoke 26, continues, the total force again increases, to the right, and up, from point 36.

By making the resilient arm 24 thinner and more resilient, other curves such as D, C, and B, also shown in FIG. 7, can be obtained. As the arms 24 are made thinner, they become more resilient, and induce a less pronounced toggle action.

The degree of stiffness of the arms 24 of the yoke may be selected to provide the desired maximum deflection within the desired range of force variation as follows. Referring to FIG. 7, it will be noted that all of the curves A, B, C, D and E intersect substantially at a central point 38, about which the curves are substantially symmetrical. The value of the upward force corresponding to this point 38 must be at the center of the desired force range. Then the minimum and maximum forces of the desired range are indicated by the lines 40 and 42, equally distant from point 38. Then the stiffness of the arms 24 are adjusted to bring the total force curve, such as curve C, just up to the line of maximum force 42 at point 44. Then as the total force reduces with increased deflection, it will decrease just to the line 40 at point 46. It can be seen that, then, the force exerted by the spring gimbal 14 will be within the desired range of forces indicated by the lines 40 and 42 between the points 52 and 54 on the curve C, and the permitted deflection under that condition will be represented by the distance between the two vertical lines 56 and 58.

For example, with a slider one-half inch in diameter, with the gimbal 14 constructed of beryllium copper .008 inch thick, with the arms of the yoke 26 .037 inch by .187 inch and about a half inch long, the point 38 in the graph of FIG. 7 occurred at about two hundred grams, the range of force variation representing by the spacing between the two lines 40 and 42 was fifteen grams, and the usable deflection indicated by the spacing between the lines 56 and 58 was .025 inch.

It will be apparent in FIG. 7 that the beam action alone, represented by curve A, could accommodate only the small motion 60 within the desired force limits 40 and 42. Even the addition of a small amount of toggle action, as in curve B, increases the permissible motion to the range 62 by reducing the rate-of-change-of-force-with-deflection within the desired operating range between the force lines 40 and 42. In curve C, representing preferred performance, the rate-of-change-of-force-with-deflection goes to zero and reverses at points 44, has a negative value between points 44 and 46, and again becomes zero and reverses at point 46. While it may be desirable under some conditions to provide just enough toggle action to make the force/deflection curve level near the point 38 in FIG. 7, so that the force would be nearly constant over a small range, the greatest motion within a prescribed force range is obtained by having the force go through the range three times as it does in curve C from point 52 to 44 to 46 to 54.

We claim:

1. In combination in a flying head construction for a magnetic surface storage device, (a) two spaced supports, (b) a resilient strut fastened to said supports, and carrying a slider therebetween, (c) said strut being preformed toward the storage surface from a straight position between said supports, (d) at least one of said supports being movable away from the other by the thrust of said strut for permitting at least partial straightening of said strut, and also for resiliently opposing such movement, so that the said strut opposes deflection away from said storage surface relative to said supports with a force that is due in part to the beam effect of the bending of said strut and in part to the toggle effect of said strut thrusting against the resilient opposition of said support.

2. The combination of claim 1 wherein said supports are sufficientliy resistant to such movement for substantially reducing the rate-of-change-of-force-with-deflection of said strut at the straight position.

3. The combination of claim 2 wherein said supports are sufficiently resistant to such movement for causing the rate-of-change-of-force-with-deflection of said strut to reverse near said straight position.

4. The combination of claim 3 wherein said supports are sufficiently yielding that the rate-of-change-of-force-with-deflection reverses at two values of force that differ by not more than the desired limit on the variation in the force to be applied to said slider.

5. In combination in a flying head construction for a magnetic surface stoage device.

(a) two spaced supports, (b) a resilient toggle strut spanning said supports, thrusting against them and carrying a slider between them, (c) at least one of said supports being movable away from the other by the thrust of said strut and resiliently opposing such movement, (d) said strut being resiliently deformable for carrying said slider transverse the direction of said thrust toward and away from the storage surface, so that the resilient opposition of said support acts through said toggle strut to urge said slider away from a toggle center position and toward or away from said storage surface, (e) said strut being preformed to the side of said toggle center line toward said storage surface, and being so preformed to a sufficient extent that the beam resilience of said strut will overpower the toggle action and will drive said strut and said slider across the center line to a rest position on the side of said center line toward said record surface.

References Cited

UNITED STATES PATENTS

| | | | |
|---|---|---|---|
| 2,808,042 | 10/1957 | Thorner | 248—204 X |
| 3,148,248 | 9/1964 | Johnson | 179—100.2 |
| 3,310,792 | 3/1967 | Groom et al. | 340—174.1 |

ROY D. FRAZIER, Primary Examiner

J. FRANKLIN FOSS, Assistant Examiner

U.S. Cl. X.R.

179—100.2; 267—1; 340—174.1